US009846891B2

(12) United States Patent
Rakshit

(10) Patent No.: US 9,846,891 B2
(45) Date of Patent: Dec. 19, 2017

(54) ADVERTISEMENT DISPLAY BASED ON COMMON DESTINATION

(75) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 13/216,749

(22) Filed: Aug. 24, 2011

(65) Prior Publication Data
US 2013/0054361 A1 Feb. 28, 2013

(51) Int. Cl.
G06Q 30/00 (2012.01)
G06Q 30/02 (2012.01)

(52) U.S. Cl.
CPC ................. *G06Q 30/0261* (2013.01)

(58) Field of Classification Search
USPC .......................................................... 705/14
See application file for complete search history.

(56) References Cited

U.S. PATENT DOCUMENTS

| | | | |
|---|---|---|---|
| 7,209,807 B2 | 4/2007 | Smith et al. | |
| 7,495,631 B2 | 2/2009 | Bhakta et al. | |
| 2002/0135515 A1* | 9/2002 | Rankin et al. | 342/385 |
| 2003/0096621 A1* | 5/2003 | Jana et al. | 455/456 |
| 2006/0173841 A1* | 8/2006 | Bill | G01C 21/3407 |
| 2008/0004953 A1 | 1/2008 | Ma et al. | |
| 2010/0027527 A1* | 2/2010 | Higgins et al. | 370/351 |
| 2011/0035282 A1 | 2/2011 | Spatscheck et al. | |
| 2013/0122937 A1* | 5/2013 | Meyer et al. | 455/456.3 |
| 2014/0025432 A1* | 1/2014 | Thomassen et al. | 705/7.34 |
| 2014/0308978 A1* | 10/2014 | Herz et al. | 455/456.3 |

OTHER PUBLICATIONS

Uwe Kubach et al., "An Adaptive, Location-Aware Hoarding Mechanism", ISSC '00 Proceedings of the Fifth IEEE Symposium on Computers and Communications (ISSC 2000), pp. 615-619.

\* cited by examiner

*Primary Examiner* — Alvin L Brown
(74) *Attorney, Agent, or Firm* — Law Offices of Ira D. Blecker, P.C.

(57) ABSTRACT

A method of advertisement display which includes: identifying a plurality of users; identifying a possible destination location for each of the users; identifying speed and possible route information for each of the users; identifying common destination locations among the plurality of users; clustering the users into groups of users having similar destination locations; identifying an advertisement specific to at least one of the clusters; and displaying the advertisement on an advertisement display. Also disclosed is a service method and computer program product.

17 Claims, 3 Drawing Sheets

ADVERTISEMENT DISPLAY BASED ON COMMON DESTINATION

BACKGROUND

The present invention relates to advertising displays and, more particularly, relates to advertising displays which may be based on a destination that a user may be traveling to in a vehicle, on non-motorized transportation or on foot.

Appropriate advertisements are beneficial for consumers and advertisers alike in that consumers are apprised of products they might be interested in buying and advertisers are able to advertise their products to a large audience.

Consumers frequently travel to a specific place for work or other activities, sometimes on a daily basis. Frequently, the consumers travel a specific route to their work or other activities destination. Along the way of the specific route traveled by the consumer, there may be different stores that the consumer might be interested in visiting and perhaps purchasing some products. If the consumer sees an advertisement for a product that the consumer might be interested in purchasing and there is a store on the way to the consumers' destination that sells the product, the consumer might stop along the way to buy the product. Since the product is available on the way to the consumer's destination, the consumer may purchase the product to save time and energy.

There may be different types of digital road side advertisements displayed along the road side. The consumer may not be interested in some of these advertisements because the advertised product may not be available in a store along the route the consumer is traveling to reach the consumer's destination. The consumer may not want to spend the extra time and energy deviating from his normal route to locate a store that stocks the product. In this case, the advertisements may not be effective for the consumer.

BRIEF SUMMARY

The various advantages and purposes of the exemplary embodiments as described above and hereafter are achieved by providing, according to a first aspect of the exemplary embodiments, a method of advertisement display which includes: identifying a plurality of users; identifying a possible destination location for each of the users; identifying speed and possible route information to the destination location for each of the users; identifying common destination locations among the plurality of users; clustering the users into groups of users having similar destination locations; identifying an advertisement specific to at least one of the clusters; and displaying the advertisement on an advertisement display. The method may be performed on one or more computing devices.

According to a second aspect of the exemplary embodiments, there is provided an advertisement display service method which includes: identifying a plurality of users by a global positioning signal (GPS) device or by a radio frequency identification (RFID) device; identifying a possible destination location for each of the users including referring to a database containing historical patterns of a user's past travels to predict the user's possible destination location; identifying route and speed information for each of the users including referring to a database containing historical patterns of a user's travels to predict the user's possible route to the destination location; identifying common target locations among the plurality of users; clustering the users into groups of users having similar destination locations; identifying an advertisement specific to at least one of the clusters; and displaying the advertisement on an advertisement display, wherein identifying and displaying the advertisement are dependent on a cluster's possible destination location.

According to a third aspect of the exemplary embodiments, there is provided a computer program product for advertisement display, the computer program product including: a computer readable storage medium having computer readable program code embodied therewith, the computer readable program code including: computer readable program code configured to identify a plurality of users; computer readable program code configured to identify a possible destination location for each of the users; computer readable program code configured to identify speed and possible route information for each of the users; computer readable program code configured to identify common destination locations among the plurality of users; computer readable program code configured to cluster the users into groups of users having similar destination locations; computer readable program code configured to identify an advertisement specific to at least one of the clusters; and computer readable program code configured to display the advertisement on an advertisement display.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

It would be desirable to display advertisements according to the consumers who might be interested in viewing them. In an exemplary embodiment, advertisements may be displayed to a cluster of consumers based on a possible destination of the consumers. Consumers may also be referred to herein as users.

Figure 1:
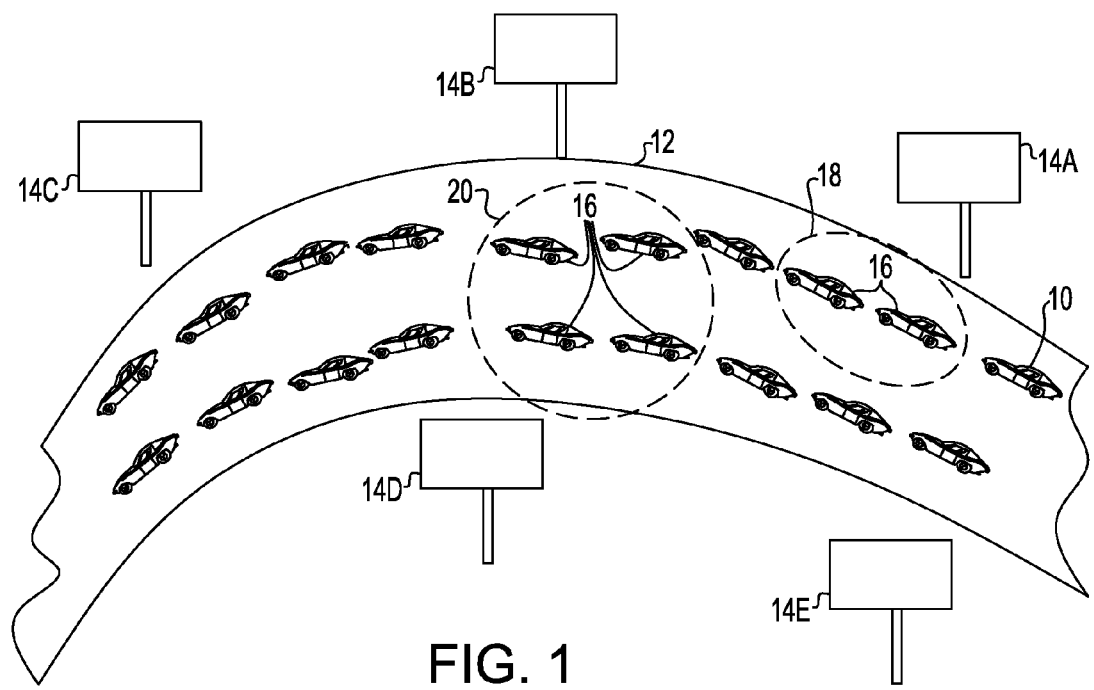
FIG. 1 is an illustration depicting vehicles traveling along a route and passing a number of advertisements.

Referring to the Figures in more detail, and particularly referring to FIG. 1, there is an illustration of a plurality of vehicles 10 traveling along a road way 12. Situated in each of the vehicles is at least one consumer. The road way 12 may be a local street, a city expressway or limited access superhighway. Along the road way 12, there may be a plurality of advertising displays 14A to 14E or more commonly known as billboards. At least some of the advertising displays 14A to 14E are digital so that advertisements may be frequently changed as conditions require.

At least some of the vehicles 10 have a tracking device within the vehicle that can communicate to a remote receiver the location of the vehicles 10. The tracking device may be a global positioning system (GPS) device, a radio frequency identification (RFID) device or any other type of device now or hereafter invented that may track a consumer's location. The GPS device may be in a GPS navigation system, in a mobile phone within the vehicle or in any other kind of GPS apparatus situated in the vehicle. The RFID device may be an active or passive RFID tag located somewhere within or on the vehicle. Those vehicles that have a tracking device may be denoted hereafter with the reference number 16.

Figure 2:
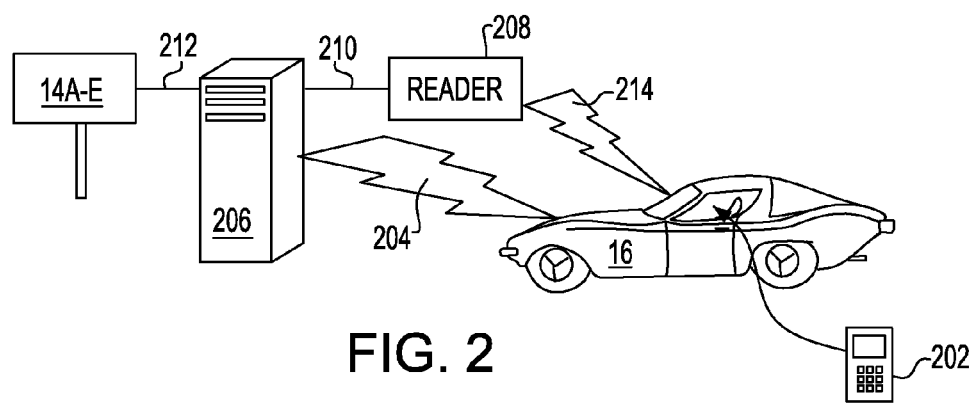
FIG. 2 is an illustration of a tracking device-enabled vehicle communicating with a remote computer.

If the vehicles 16 have a tracking device as contemplated by the exemplary embodiments, the tracking device may communicate with a remote computer. Referring now to FIG. 2, vehicle 16 has a tracking device 202 of some sort located on or within the vehicle 16. For purposes of illustration and not limitation, the tracking device 202 shown may be a mobile phone having GPS capability. If the tracking device 202 is a GPS device, the GPS device may communicate wirelessly 204, by a cellular or satellite network, to a remote computer 206. If the tracking device 202 is an RFID device, it may have to be read 214 by a reader 208 located along the roadway. The reader 208 may then communicate 210, either by wireless means or wired means, to the remote computer 206.

The tracking device 202 may provide information to the remote computer 206 such as location, direction of travel and speed of the vehicle 16. The remote computer 206 receives such information from the tracking device 202 and may store such information for future use. The remote computer 206 may perform an historical analysis of the vehicle's past travels and based on the date, time of day, day of the week and possibly other factors, the remote computer 206 may forecast a possible destination or target location of the vehicle 16. In a similar manner, the remote computer 206 may gather information from the tracking devices 202 of other like vehicles 16 and from this gathered information, forecast possible destinations for these other like vehicles 16. The remote computer 206 may then identify common target locations of different vehicles which may be traveling at approximately the same rate of speed and thereafter identify clusters of vehicles having a common target location and common speed. The remote computer 206 may further identify clusters traveling to the same target location at approximately the same rate of speed but by a different route.

In gathering information about users' past and present travels, the remote computer 206 may store the information in an historical database for future use in predicting users' travel destination and route as well as conventional studying of traffic patterns.

There are commonly available data mining programs that may perform the historical analysis and forecasting functions of the exemplary embodiments. Some of these data mining programs are SAS Modeler (SAS Institute), SPSS Modeler (IBM Corporation) and Microsoft Clustering Algorithm (Microsoft Corporation).

Referring back to FIG. 1, the remote computer 206 has identified two clusters of vehicles 16, with each cluster possibly heading to a different target location. Cluster 18 of vehicles 16 is forecast to travel to target location 1 while cluster 20 of vehicles 16 is forecast to travel to target location 2. Remote computer 206 may also forecast which route the clusters 18 and 20 are likely to travel to target locations 1 and 2 respectively. Remote computer 206 may then communicate 212 (FIG. 2), by wireless or wired means, with advertising displays 14A to 14E to display appropriate advertisements for clusters 18 and 20. More specifically, advertising displays 14B and/or 14D may display advertisements specifically directed to cluster 18 predicted to be traveling to target location 1 while advertising display 14C may display advertisements specifically directed to cluster 20 predicted to be traveling to target location 2. The advertising displays 14B, C and D may also display advertisements based on the clusters' 18 and 20 predicted route as well. In this regard, the entity controlling remote computer 206 may have relationships with advertisers who may wish to advertise products that may interest the users who may be monitored by remote computer 206. The entity controlling remote computer 206 may thus display advertisements from its advertisers that may interest the users in the vehicles 16 in the clusters 18 and 20, based on the users' predicted travel destination and route. Further, the entity controlling remote computer 206 may also display advertisements from its advertisers that may entice one or more of the users in the vehicles 16 in the clusters 18 and 20 to change their route to their predicted travel destination.

Different criteria may be used for identifying the advertisement to be displayed. The advertisement may be displayed based on:

The Number of Users in the Same Cluster.

The advertiser may choose to display the advertisement to a cluster that has the maximum number of users.

The Target Location that is Nearest the Clusters.

For multiple clusters, the advertisement may be displayed for the cluster with the target location that is nearest since the clusters traveling further may have another opportunity to view another advertisement.

The Users' Preferred Route.

A cluster of users may usually follow the same route but the cluster may deviate for whatever reason. In that case, the advertisement may be based on the users' preferred route.

The Speed of the Cluster.

If the cluster is moving at a higher rate of speed, it may be best to show the advertisement as images or slides. If the cluster is moving at a slower rate of speed, then it may be best to show the advertisement as video.

Other Factors.

The date, time, target location may also be considered for advertisement display prioritization.

It may happen that there are two or more clusters passing a road side sign at the same time. Using the criteria discussed above, it may be necessary to qualitatively rank the clusters. For example, clusters with more users are higher ranked than clusters with fewer users so that the road side sign would be more likely to display advertising of interest to the higher ranked cluster. Another example might be that clusters traveling less distance are higher ranked than clusters traveling a longer distance because there may be only one opportunity to display a road sign to the first clusters while there may be other opportunities to display a road sign to the second clusters.

The description of the exemplary embodiments has thus far focused on the users as being located in vehicles. The exemplary embodiments may also have applicability to pedestrians and non-motorized modes of transportation such as bicycles. With pedestrians and bicyclists, the advertisements may be displayed on sidewalks near where pedestrians and bicyclists are likely to pass. The tracking device that pedestrians and bicyclists may use may be a mobile device such as a mobile phone or smart phone which may have GPS capability.

Figure 3:
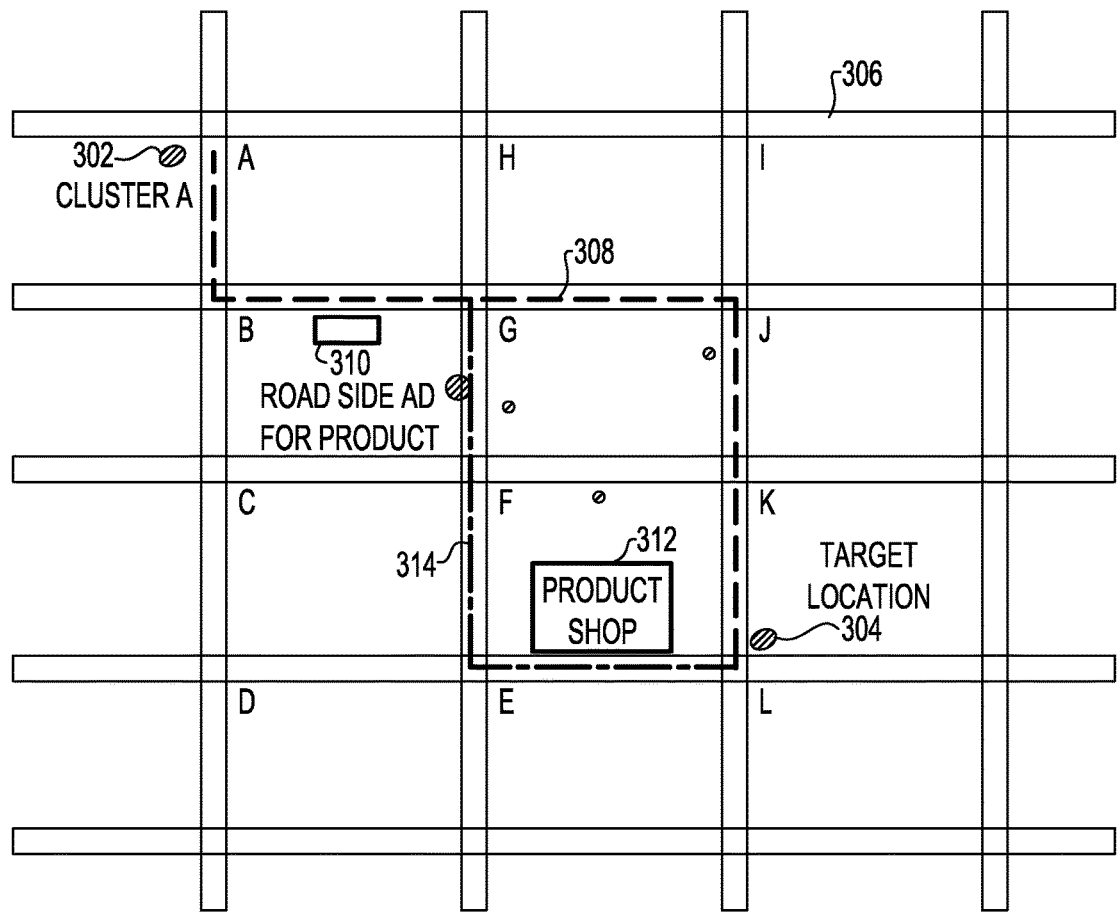
FIG. 3 is an illustration of a route that a user may take from a present location to a destination (target) location.

Referring now to FIG. 3, there is an illustration of an implementation of the exemplary embodiments. Cluster A 302, at point A in the grid of streets 306, is forecast to travel to the target location 304 at point L in the grid of streets 306. Cluster A 302 is expected to follow the route 308 from point A to point B, turning left and continuing to point J and then turning right and continuing to point L, the target location 304. Along the just-described route 308, cluster A 302 may pass a road side sign 310. Remote computer 206 (FIG. 2), knowing the possible route that cluster A 302 may take to target location 304, has caused an advertisement to be displayed on road side sign 310 which advertises a product to be found at a product shop 312 near the target location 304. At least one user in cluster A 302 decides that the advertised product is of interest and so this user may change his direction to alternative route 314 which requires a right turn at point G followed by a left turn at point E to the product shop at 312. After visiting the product shop 312, the user may proceed to the target location 304.

Figure 4:
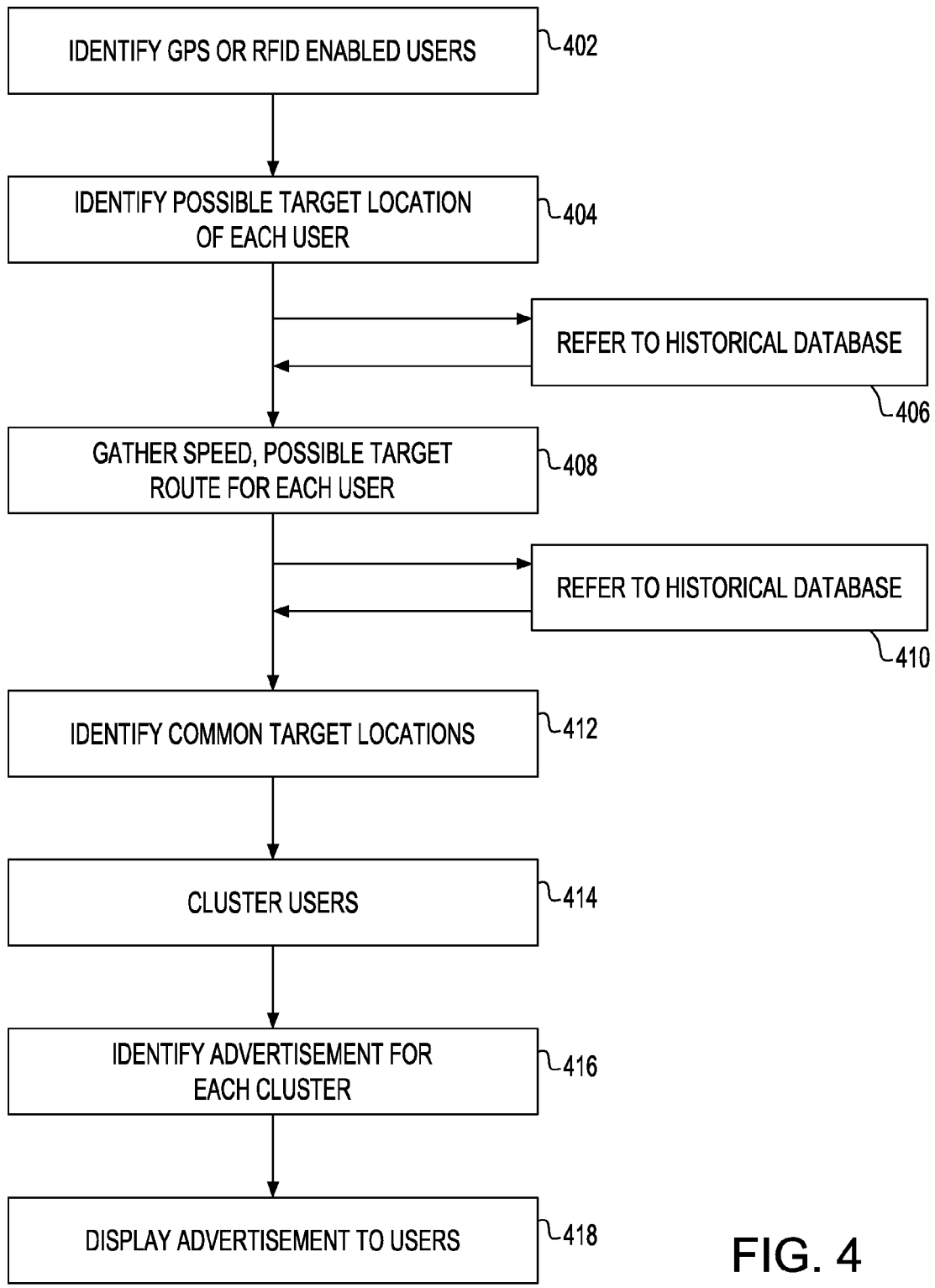
FIG. 4 is a flow chart illustrating a method of the exemplary embodiments.

Referring now to FIG. 4, a flow chart illustrating the exemplary embodiments is illustrated. First, users are identified using their GPS or RFID signal, block 402. If other means are identified for tracking users, those means may also be used in the exemplary embodiments.

Thereafter, a possible target location of each user is identified, block 404. It may be advantageous to refer to an historical database which has previously tracked the users for information on possible target locations for each user, block 406.

Information may be identified for each user such as speed and possible target route, block 408. Here again, it may be advantageous to refer to the historical database for information on possible routes that the users may take to the possible target locations, block 410.

Common target locations of the users may be identified, block 412.

Clusters may then be formed of those users having a common target location, block 414.

An advertisement may be identified for each cluster, keeping in mind the various criteria discussed earlier as well as the ranking of the cluster, block 416.

Lastly, the advertisement may be displayed on the digital road sign, block 418.

The process may end once the users in the cluster reach their destination. If all users do not end up at the same destination, this information may be recorded in the historical database for use in future trips.

Figure 5:
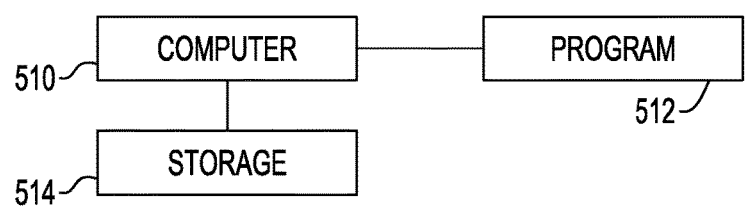
FIG. 5 is a block diagram that illustrates one exemplary hardware environment of the exemplary embodiments.

The program environment in which the exemplary embodiments may be executed illustratively incorporates a general-purpose computer. FIG. 5 is a block diagram that illustrates one exemplary hardware environment of the present invention. The exemplary embodiments may be implemented using a surface computer 510 including a computer processor, random access memory (RAM), read-only memory (ROM) and other components. Resident in the computer 510, or peripheral to it, will be a storage device 514 of some type such as a hard disk drive, floppy disk drive, CD-ROM drive, tape drive or other storage device.

Generally speaking, the software implementation of the exemplary embodiments, program 512 in FIG. 5, is tangibly embodied in a computer-readable medium such as one of the storage devices 514 mentioned above. The program 512 includes instructions which, when read and executed by the computer 510 causes the computer 510 to perform the steps necessary to execute the steps or elements of the exemplary embodiments.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of advertisement display comprising:
   identifying a plurality of users traveling a common route wherein identifying is solely by a tracking device with each of the users that tracks the current location of each of the users, the plurality of users not traveling together on a common conveyance;
   identifying a predicted destination location for each of the users wherein identifying a predicted location includes referring to a database containing historical patterns of a user's past travels to predict a user's possible destination location;
   identifying speed and possible route information to the predicted destination location for each of the users;
   identifying common predicted destination locations among the plurality of users;
   clustering the users into groups of users having the common predicted destination locations and traveling to the common predicted destination locations by a same route, at a same rate of speed and at a same time;
   identifying an advertisement specific to at least one of the clusters having one of the common predicted destination locations; and
   displaying the advertisement on an advertisement display to the at least one of the clusters;
   wherein the method is performed on one or more computing devices.

2. The method of claim 1 wherein the advertisement display is at a first location such that the first location is different than the predicted destination location and wherein identifying and displaying the advertisement are dependent on a cluster's predicted destination location.

3. The method of claim 1 wherein the advertisement display is at a first location such that the first location is different than the predicted destination location and wherein identifying and displaying the advertisement are dependent on a cluster's predicted destination location and possible route to the predicted destination location.

4. The method of claim 1 wherein the tracking device is a global positioning signal (GPS) device.

5. The method of claim 1 wherein the tracking device is a radio frequency identification (RFID) device.

6. The method of claim 1 wherein identifying route and speed information includes referring to a database containing historical patterns of a user's past travels to predict a user's possible route to the predicted destination location.

7. The method of claim 1 wherein the plurality of users are in vehicles.

8. The method of claim 1 wherein the plurality of users are on foot or on bicycles.

9. An advertisement display service method comprising:
   identifying a plurality of users traveling a common route wherein identifying is solely by a global positioning signal (GPS) device or by a radio frequency identification (RFID) device with each of the users that tracks the current location of each of the users, the plurality of users not traveling together on a common conveyance;
   identifying a predicted destination location for each of the users including referring to a database containing historical patterns of a user's past travels to predict the user's possible destination location;
   identifying route and speed information for each of the users including referring to a database containing historical patterns of a user's travels to predict the user's possible route to the predicted destination location;
   identifying common target locations among the plurality of users;

clustering the users into groups of users having the common predicted destination locations and traveling to the common predicted destination locations by a same route, at a same rate of speed and at a same time;

identifying an advertisement specific to at least one of the clusters having one of the common predicted destination locations; and displaying the advertisement on an advertisement display to the at least one of the clusters, wherein identifying and displaying the advertisement are dependent on a cluster's predicted destination location;

wherein the method is performed on one or more computing devices.

10. A computer program product for advertisement display, the computer program product comprising:

a non-transitory computer readable storage medium having computer readable program code embodied therewith, the computer readable program code comprising:

computer readable program code configured to identify a plurality of users traveling a common route wherein each of the plurality of users is identified by a tracking device with each of the users that tracks the current location of each of the users, the plurality of users not traveling together on a common conveyance;

computer readable program code configured to identify a predicted destination location for each of the users wherein computer readable program code configured to identify a predicted destination location includes computer readable program code configured to refer to a database containing historical patterns of a user's past travels to predict the user's possible destination location;

computer readable program code configured to identify speed and possible route information to the predicted destination for each of the users;

computer readable program code configured to identify common predicted destination locations among the plurality of users;

computer readable program code configured to cluster the users into groups of users having the common predicted destination locations and traveling to the common predicted destination locations by a same route, at a same rate of speed and at a same time;

computer readable program code configured to identify an advertisement specific to at least one of the clusters having one of the common predicted destination locations; and computer readable program code configured to display the advertisement to the at least one of the clusters on an advertisement display.

11. The computer program product of claim 10 wherein the advertisement display is at a first location such that the first location is different than the predicted destination location and wherein computer readable program code configured to identify and display the advertisement are dependent on a cluster's predicted destination location.

12. The computer program product of claim 10 wherein the advertisement display is at a first location such that the first location is different than the predicted destination location and wherein computer readable program code configured to identify and display the advertisement are dependent on a cluster's predicted destination location and possible route to the predicted destination location.

13. The computer program product of claim 10 wherein the tracking device is a global positioning signal (GPS) device.

14. The computer program product of claim 10 wherein the tracking device is a radio frequency identification (RFID) device.

15. The computer program product of claim 10 wherein computer readable program code configured to identify speed and possible route information includes computer readable program code configured to refer to a database containing historical patterns of a user's past travels to predict the user's possible route to the predicted destination location.

16. The computer program product of claim 10 wherein the plurality of users are in vehicles.

17. The computer program product of claim 10 wherein the plurality of users are on foot or on bicycles.

* * * * *